United States Patent
Arya et al.

[19]

[11] Patent Number: 5,873,159
[45] Date of Patent: Feb. 23, 1999

[54] METHOD OF MANUFACTURING A TRANSDUCER SUSPENSION SYSTEM

[75] Inventors: Satya Prakash Arya, San Jose, Calif.; William W. Brooks, Jr., Rochester, Minn.; Wesley L. Hillman, Morgan Hill, Calif.; Tzong-Shii Pan, San Jose, Calif.; John E. Sell, San Jose, Calif.; Victor Wing Chun Shum, San Jose, Calif.; Randall George Simmons, San Jose, Calif.

[73] Assignee: International Business Machines Corporation, Armonk, N.Y.

[21] Appl. No.: 889,803

[22] Filed: Jul. 8, 1997

[51] Int. Cl.⁶ ........................................................ G11B 5/42
[52] U.S. Cl. ......................................... 29/603.03; 360/104
[58] Field of Search .......................... 29/603.03; 360/103, 360/104

[56] References Cited

U.S. PATENT DOCUMENTS

| | | | |
|---|---|---|---|
| 3,745,543 | 7/1973 | King | 340/174.1 E |
| 3,975,770 | 8/1976 | Spash et al. | 360/103 |
| 4,642,716 | 2/1987 | Wakabayashi et al. | 360/104 |
| 4,759,119 | 7/1988 | Noguchi et al. | 29/603 |
| 4,811,141 | 3/1989 | McConica et al. | 360/110 |
| 5,012,368 | 4/1991 | Bosier et al. | 360/104 |
| 5,343,344 | 8/1994 | Nagase | 360/104 |
| 5,384,432 | 1/1995 | Noro et al. | 174/117 FF |
| 5,392,179 | 2/1995 | Sendoda | 360/104 |
| 5,491,597 | 2/1996 | Bennin et al. | 360/104 |

Primary Examiner—Carl E. Hall
Attorney, Agent, or Firm—Douglas R. Millett

[57] ABSTRACT

A transducer suspension system has a transducer head, laminated member, and a load beam. The laminated member is comprised of a support layer, an electrically insulating layer, and an electrically conducting layer. The electrical lines are formed directly into the laminated member. A first end of the support layer has an aperture into which a tongue section protrudes. The transducer head is attached to the tongue section. A platform section is formed between the aperture and the end of the support layer. The electrical lines run to the transducer head along the platform section. The load beam is attached to the laminated member and provides rigid support. The load beam has an aperture located directly above the platform section and provides access to allow clamping of the electrical lines and the platform section during electrical attach of the lines to the transducer head. Precise electrical attachment is achieved without unwanted bending of the delicate flexure section of the suspension.

20 Claims, 6 Drawing Sheets

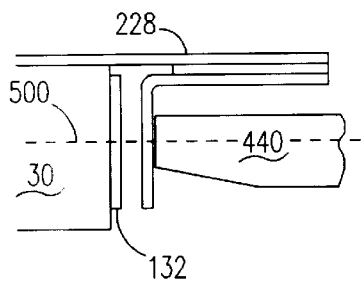
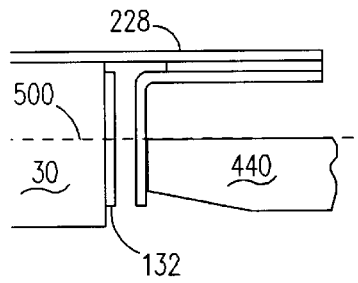
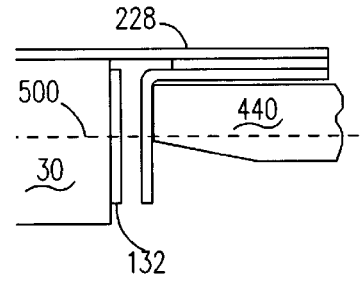
FIG. 8a     FIG. 8b     FIG. 8c
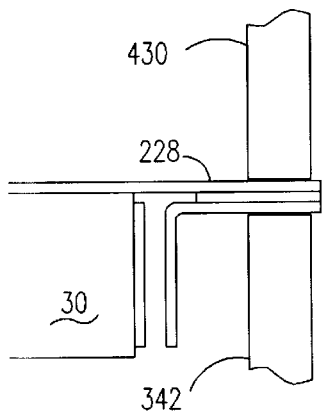
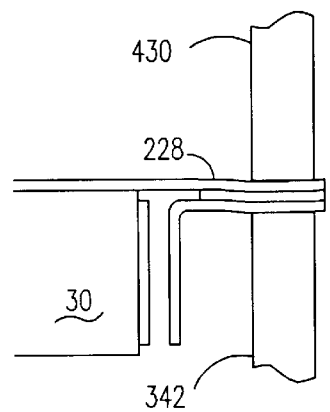
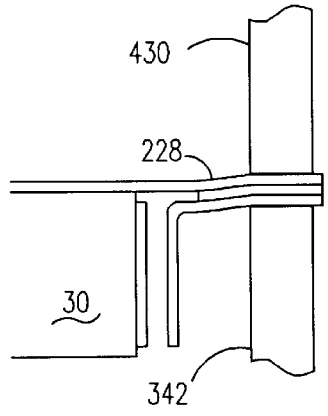
FIG. 9a     FIG. 9b     FIG. 9c

METHOD OF MANUFACTURING A TRANSDUCER SUSPENSION SYSTEM

BACKGROUND OF THE INVENTION

1. Field of the Invention

This invention relates generally to transducer suspension systems and more particularly to a suspension system and method for efficient manufacture.

2. Description of the Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

Examples of suspension systems are shown in the following references: U.S. Pat. No. 3,745,543 issued Jul. 10, 1973 to King; U.S. Pat. No. 3,975,770 issued Aug. 17, 1976 to Spash et al; U.S. Pat. No. 4,642,716 issued Feb. 10, 1987 to Wakabayashi et al; U.S. Pat. No. 4,759,119 issued Jul. 26, 1988 to Noguchi et al; U.S. Pat. No. 4,811,141 issued Mar. 7, 1989 to McConica et al; U.S. Pat. No. 5,012,368 issued Apr. 30, 1991 to Bosier et al; U.S. Pat. No. 5,343,344 issued Aug. 30, 1994 to Nagase; U.S. Pat. No. 5,384,432 issued Jan. 24, 1995 to Noro et al; U.S. Pat. No. 5,392,179 issued Feb. 21, 1995 to Sendoda; and U.S. Pat. No. 5,491,597 issued Feb. 13, 1996 to Bennin et al.

The suspension must meet several requirements. The suspension must be flexible and provide a bias force in the vertical direction. This is necessary to provide a compensating force to the lifting force of the air bearing in order to keep the slider at the correct height above the disk. Also, vertical flexibility is needed to allow the slider to be loaded and unloaded away from the disk. Another requirement of the suspension is that it must provide a pivotal connection for the slider. Irregularities in operation may result in misalignment of the slider. The slider is able to compensate for these problems by pitching and/or rolling slightly to maintain the proper orientation necessary for the air bearing. Another requirement of the suspension is that it must be rigid in the lateral direction. This is needed to prevent the head from moving side to side, which would result in the head reading the wrong track.

As disk drives have become smaller in size, the recorded track density has increased dramatically. This has necessitated the use of smaller and smaller heads and suspensions. However, these smaller geometries of the suspension and head make manufacture much more difficult. In particular, it has become extremely difficult to attach the electrical wires along the suspension and connect them to the head. The process of connecting the wires to the head may cause unwanted permanent deformation of the delicate flexible end of the suspension. This in turn may cause the slider head to be misoriented and result in its inability to maintain a proper air bearing with resulting disk drive failure and loss of data. What is needed is a suspension design and method of manufacture which lends itself to these smaller geometries.

SUMMARY OF THE INVENTION

Briefly, in a preferred embodiment of the present invention, a suspension system comprises a rigid load beam member and a laminated member. The laminated member is comprised of three layers: a support layer, an electrically insulating layer, and an electrically conducting layer. The laminated member is etched such that the electrical lines are formed in the conductive layer. A first end of the laminated member has an aperture with a flexible tongue section jutting into the aperture. The slider/transducer head is attached to the tongue section. Between the tongue section and the first end is a platform section which provides support for the electrical lines which pass to the front of the slider/transducer. This platform also permits reforming and correction of the static attitude of the slider during bonding of the electrical lines. The load beam is attached to one side of the laminated member and has an aperture located directly over the platform section.

During manufacture of the suspension, a first pair of clamping members engage the platform section from below, while a second pair of clamping members pass through the load beam aperture to engage the platform section opposite to the first clamping members. The electrical lines are then attached to the electrical pads on the slider/transducer head in a preferred sequence. During the attachment process, the platform section is held in an optimum position such that no unwanted permanent deformation is caused in the tongue section. Additional steps in the manufacture process include loading and unloading the suspension and head from a specially designed tool block and the attachment of the head to the suspension.

The result is a suspension design which may be manufactured in a very efficient automated or manual process.

For a fuller understanding of the nature and advantages of the present invention, reference should be made to the following detailed description taken in conjunction with the accompanying drawings.

BRIEF DESCRIPTION OF THE DRAWINGS

FIGS. 8a, 8b, and 8c are side views of the suspension of FIG. 3 during the manufacturing process; and FIGS. 9a, 9b, and 9c are side views of the suspension of FIG. 3 during the manufacturing process.

DESCRIPTION OF THE PREFERRED EMBODIMENTS

Figure 1:
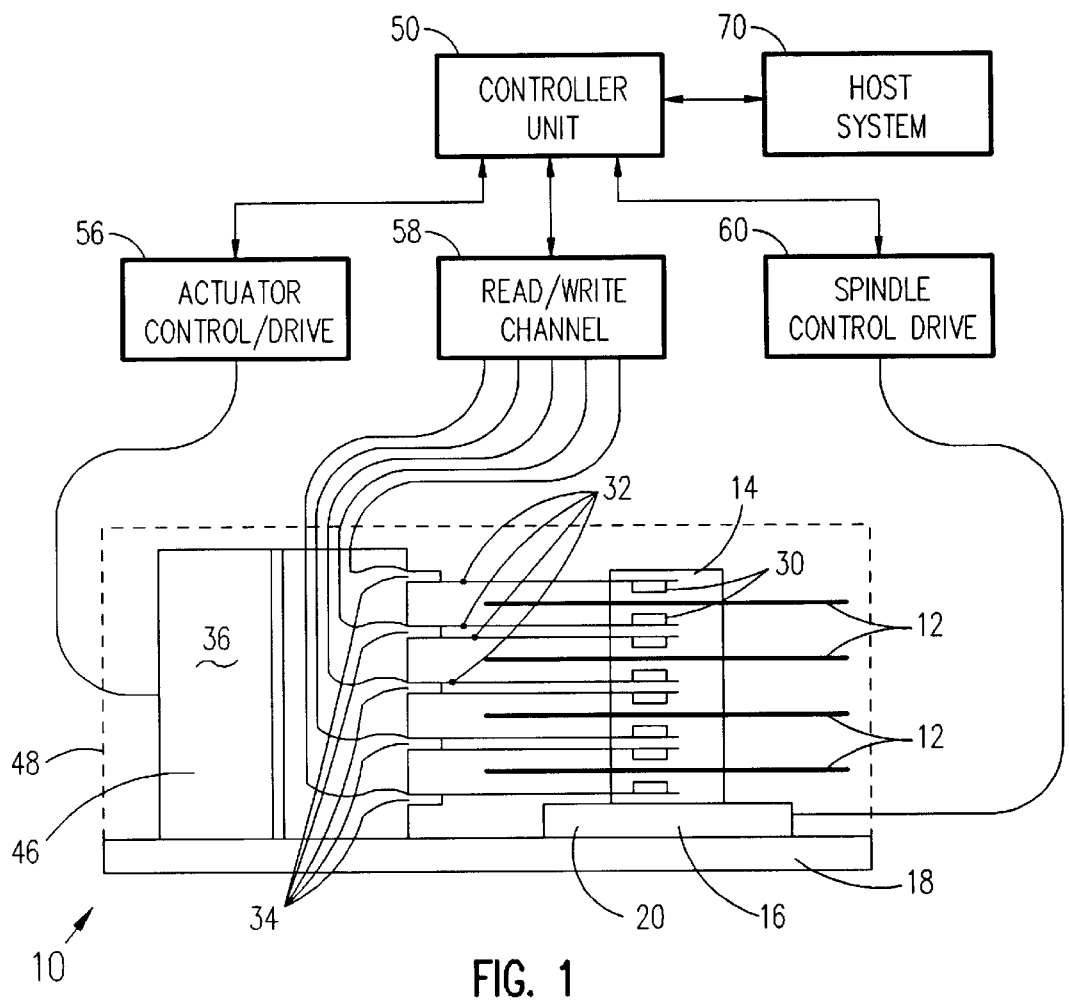
FIG. 1 is a schematic diagram of a data storage system of the present invention.
Figure 2:
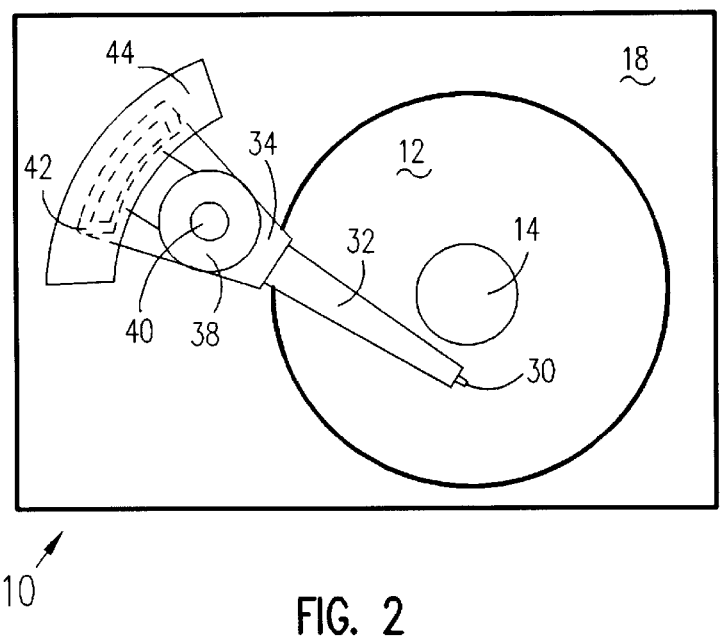
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 have a corresponding head 30. Each head 30 is attached to one of a plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspensions 32, arms 34 and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request that digital data be read from disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
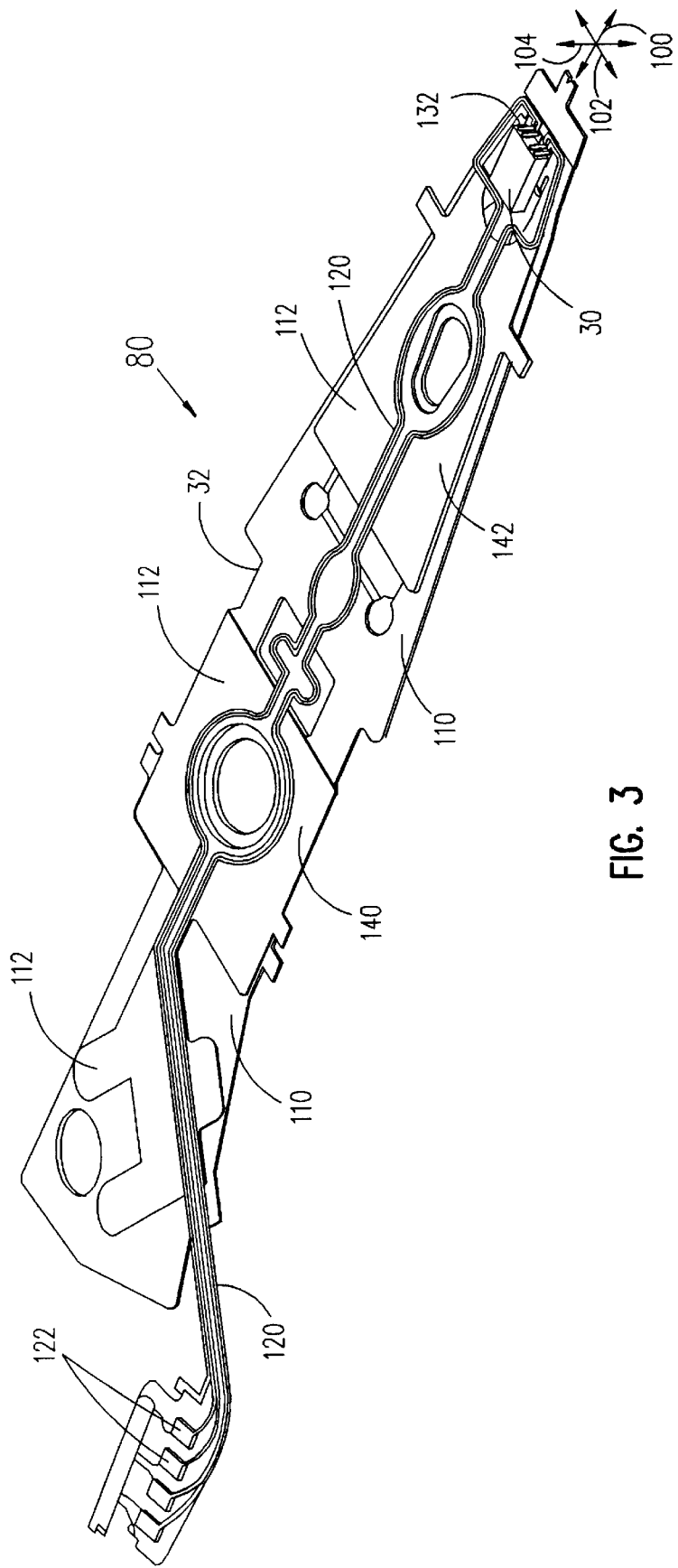
FIG. 3 is a detailed perspective view of a suspension system of FIG. 1.

FIG. 3 shows a perspective view of a head 30 attached to a suspension 32. This combination is referred to as a suspension assembly or head gimbal assembly (HGA) 80. Suspension 32 has a longitudinal axis 100, a lateral axis 102 and a vertical axis 104. Suspension 32 is comprised with a load beam 110 and a laminated member 112. Laminated member 112 is formed from a three-layer laminated material comprised of a steel support layer, an electrically insulating layer, and an electrically conductive layer. The various layers of the laminated member 112 are etched away in a photolithographic process to form the desired shapes.

The suspension 32 is extremely small. The distance from the point of attachment to the actuator arm 34 to the end of the suspension is typically about 18 mm. The head 30 typically measures 1.25 mm×1.00 mm×0.30 mm. These dimensions vary according to the disk, file and slider size.

The electrically conducting layer and electrically insulating layer are etched to form electrical lines 120 which run from a rear termination pad area 122 to the head 30. Head 30 is comprised of a slider and transducer electronics. The electrical lines 120 terminate and are electrically attached to the head 30 at the head termination pads 132. The electrical lines 120 are bent vertically upward at the head termination pads 132.

The support layer of the laminated member 112 is formed into a base plate member 140 and a flexure member 142. The base plate member 140 is attached to an actuator arm 34 by swage, welding, or an adhesive process. Flexure member 142 provides a gimbal mount for attachment of the head 30. The gimbal mount allows the head 30 to pivot in order to adjust its orientation (static attitude) to achieve the proper air bearing between the head 30 and disk 12 while the disk 12 is rotating. The flying height of the head 30 varies from near contact to 100 nm depending upon the design, but typically during operation is 50 nm or less height above the disk. Proper alignment of the head 30 on the gimbal mount is critical.

Both the base plate 140 and flexure 142 also serve the purpose of providing support for the electrical lines 120.

Figure 4A:
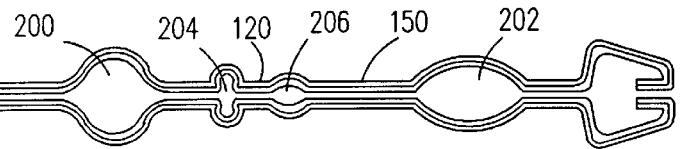
FIGS. 4a, 4b, 4c, and 4d are top views of various layers of the suspension of FIG. 3.
Figure 4B:
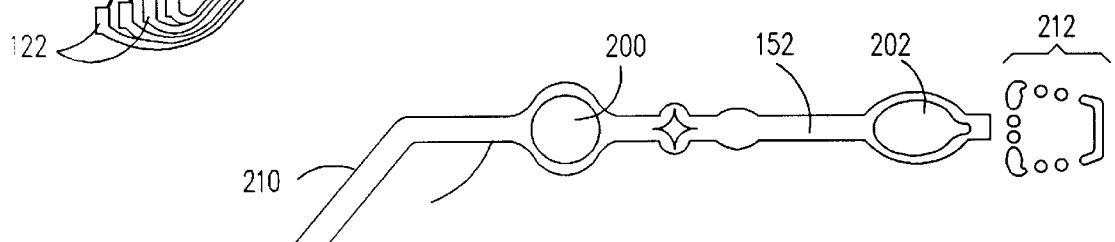
Figure 4C:
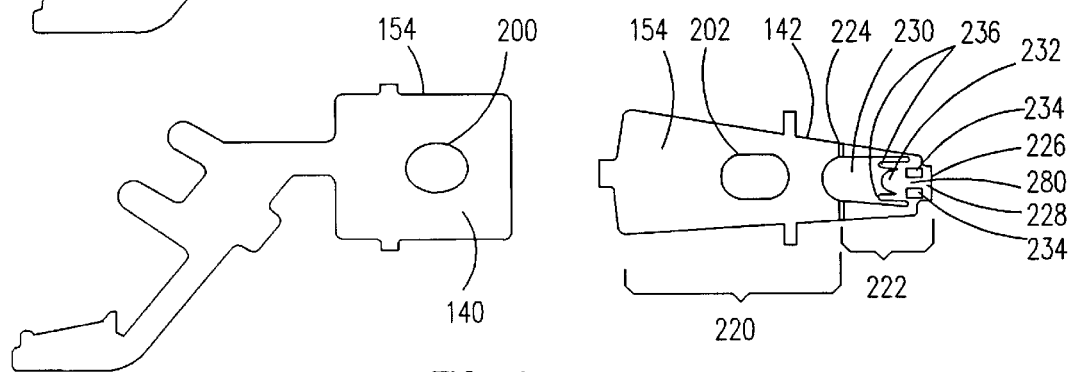

FIGS. 4a–4d show top views of the various overlying element layers of suspension 32. FIGS. 4a–4c show respectively, the electrically conducting layer 150, the electrically insulating layer 152 and the support layer 154 of the laminated member 112. Initially, the layers 150, 152 and 154 are layers in a single laminated sheet of material. The member 112 is then formed from the sheet by using photolithographic etch processes as are known in the art. Layer 150 is made of a conducting material such as copper. In a preferred embodiment, the material is copper and has a thickness of between 2 and 25 microns and preferably 18 microns. Layer 152 is made of an electrically insulating material and in a preferred embodiment is made of polyimide or Teflon and has a thickness of between 5 and 25 microns and preferably 18 microns. Layer 154 is made of a thin stiff material which is able to bend slightly, and in a preferred embodiment is made of stainless steel and has a thickness of between 12 and 30 microns and preferably 18 microns.

Referring now to FIG. 4a. The electrical lines 120 comprise four separate lines. In a preferred embodiment, two of the lines run to the inductive element in the head 30 which is used to write data and two of the lines run to the magnetoresistive element in the head which is used to read data. Each of the lines has a thin rectangular cross section. The lines 120 start at the termination pad area 122. Pads 122 provide connection to the read/write channel 58. The pads 122 are located on the side of the actuator arms 34 when the drive is fully assembled. The lines 120 run from the side of the arm 34 toward the center longitudinal axis 100 of the suspension 32. The lines 120 then run in a generally longitudinal direction toward the head 30.

The lines separate to run along both sides of two apertures 200 and 202. The apertures 200 and 202 are used to provide access for tooling pins which are used to align the laminated member and the load beam during manufacturing. Another separation of the lines 120 occurs at points 204 and 206 and are used to provide some slack in the lines 120 to allow for movement of the suspension during operation.

At the distal end of suspension 32, the lines 120 separate and run along either side of head 30, then turn backward the head 30 to terminate at the front face of head 30 at the head termination pads 132. This is necessary because the transducer electronics are located on the front face of the slider. The lines 120 are bent 90° vertically in order to interface with pads 132.

FIG. 4b shows a top view of the electrically insulating layer 152. Layer 152 is shaped to provide electrical insulation protection to the lines 120 which directly overlay the layer 152. Layer 152 forms an insulating strip 210 directly beneath the lines 120. At the head area, layer 152 is shaped into a series of pads 212 which underlie lines 120. This is done to allow the lines 120 to be more flexible at the head area such that the lines 120 do not interfere with movement of the head 30.

FIG. 4c shows a top view of the support layer 154. Base plate member 140 provides support for the rear section of the lines 120. Flexure member 142 has a rear portion 220 and a front portion 222. Front portion 222 is raised slightly above the plane of rear portion 220 by means of a stamped bend 224. The front portion 222 has a distal end 226 having a front platform 228 which provides support for lines 120. Behind platform 228 is a flexure aperture 230. A tongue section 232 provides support and an attachment point for head 30. Between tongue section 232 and platform 228 are a pair of rectangular apertures 234. Apertures 234 allow the base for the lines 120 to bend as they approach the termination pads 132. A pair of tabs 236 extend from tongue section 232 and function as motion limiters when they are bent back under load beam 110. A section 280 (known as the dog bone) is located between the apertures 234.

Figure 4D:
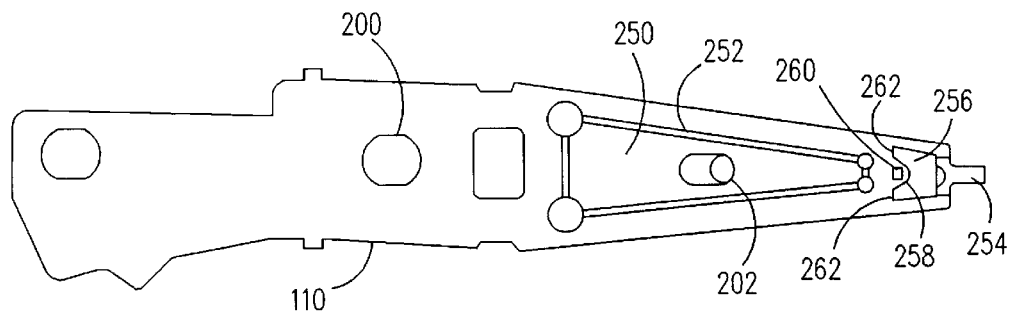

FIG. 4d shows a top view of load beam 110. Load beam 110 is generally flat and rigid and made of a stainless steel or other rigid material. In the preferred embodiment, the load beam 110 is stainless steel of about 0.025 to 0.075 mm. thick and preferably 0.050 mm. It is desirable to maintain the weight and inertia of the load beam 110 as small as possible without compromising its structural rigidity.

Load beam 110 has a depressed section 250 which is used to provide additional structural stiffness. Section 250 has an aperture 252 which is used for locating the suspension during the assembly process.

Beam 110 has a distal end with a tab 254 which is used for merging the slider over the disk and loading/unloading of the slider during operation of the drive. An aperture 256 is located behind tab 254. A tongue section 258 extends into aperture 256. A stamped raised button or dimple 260 is located on tongue 258. Dimple 260 contacts tongue section 232 of flexure member 154 and allows head 30 to gimbal (pitch and roll) slightly such that it allows the air bearing to follow the disk contour as it flies over the disk. A pair of corners 262 of aperture 256 provide a contact point for tabs 236 of flexure 154 such that tabs 236 pass under load beam 110 and provide a motion limiting function for the flexure member 154. Beam 110 is also formed by a photolithographic process and the raised features are stamped.

The laminated member 112 and the load beam 110 are attached to each other by laser welding while the pieces are held in tooling pins which pass through apertures 200 and 202.

Figure 5:
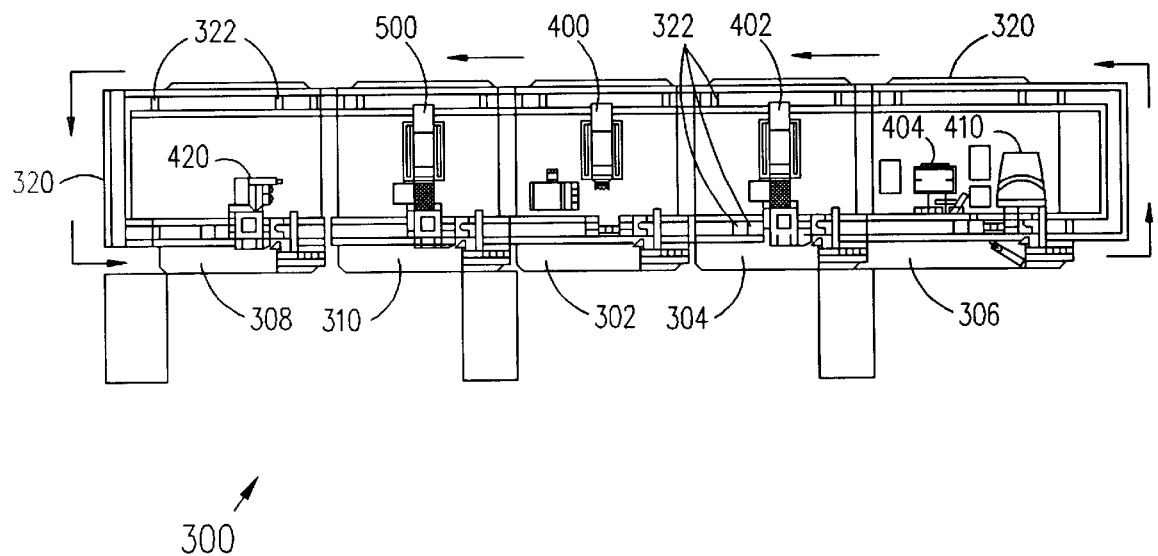
FIG. 5 is a top view of an automated assembly system for the assembly of the suspension of FIG. 3.

FIG. 5 shows a top view of an automated assembly system for suspension 32 and is designated by the general reference number 300. System 300 comprises five separate stations: a head load station 302, a suspension load station 304, a head attach station 306, an electrical attach station 308, and a suspension off load station 310. The system 300 has a circular conveyor belt 320 which runs around all of the stations. The belt 320 carries a plurality of tool blocks 322 which are constantly moving from station to station.

Figure 6:
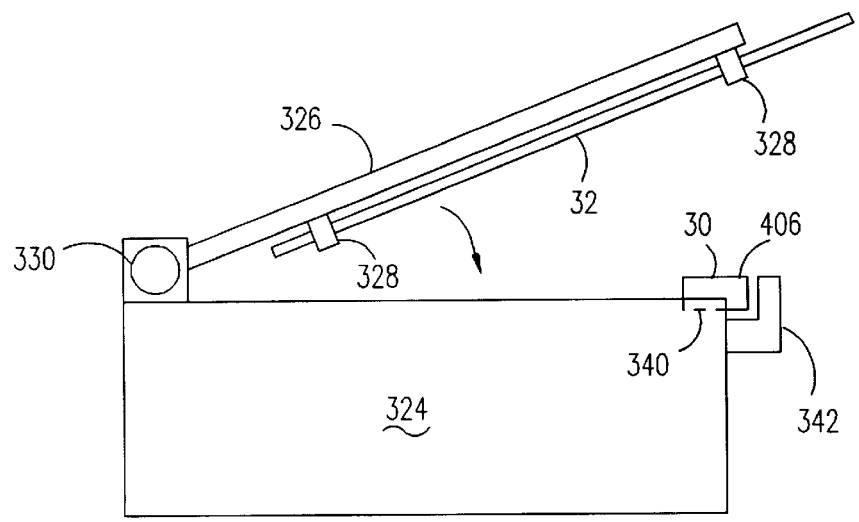
FIG. 6 is a side view of a tool block used in the system of FIG. 5.

FIG. 6 shows a side view of a tool block and is designated by the general reference number 322. Block 322 has a solid base member 324 and a suspension holder member 326. Holder 326 has tab members 328 which are used to hold a suspension 32. Holder 326 is pivotally mounted to base 324 by a rotational pivot 330. Pivot 330 is spring loaded such that holder 326 is bias towards the down position against base member 324. The pivot 330 also has a position latch which allows holder 326 to stay in an up or down position.

Base 324 has an aperture 340 for receiving a head 30. Base 324 also has a pair of support pins 342 (only one of which is shown) located on either side and in front of the aperture 340.

Returning now to FIG. 5. At station 302, a single slider head 30 is placed into aperture 340 of tool block 322 by an automated robot hand 400. The tool block is then conveyed to station 304. At station 304, a single suspension 32 is placed in holder 326 of the tool block 322. At this stage, the suspension 32 comprises the attached load beam and laminated member as shown in FIG. 3, but without the head 30. At station 304 an automated robot hand is used to load the suspension 32.

Next, at station 306 a glue dispensing machine 404 dispenses a small amount of adhesive to the top surface 406 of head 30 in tool block 322. The amount of glue is just enough to provide sufficient bonding between head 30 and suspension 32.

After the glue is dispensed, a machine 410 moves holder 326 from an up position to a down position such that tongue section 230 of suspension 32 engages the top surface 406 of head 30. The tool block 322 is then sent along the conveyor belt 320 to station 308. Sufficient time is allowed to pass such that the adhesive is cured before it reaches station 308.

At station 308, a machine 420 electrically connects lines 120 to pads 132 of head 30.

Figure 7:
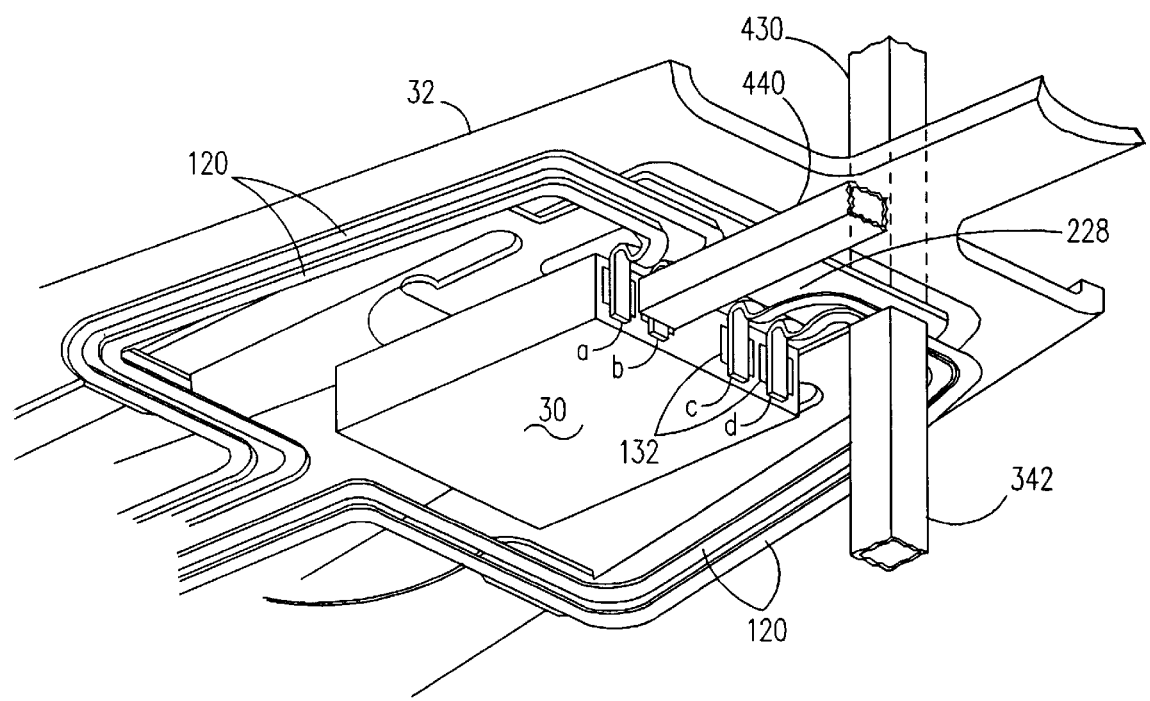
FIG. 7 is a detailed perspective view of the suspension of FIG. 3 during the manufacture process.

FIG. 7 shows a bottom perspective view of suspension 32 and head 30 at station 308. One of the two support pins 342 of tool block 322 engages the lines 120 at platform section 228. Tab 342 engages platform 228 at a location to the side of head 30 such that the front side of the slider and the pads 132 are not obstructed during the electrical line bonding process. Another tab 430 comes down vertically from machine 420, passing through aperture 256 of load beam 110 to engage and support platform 228 from the opposite side.

Another pair of tabs similar to 342 and 430 engage platform 228 on the opposite side of head 30 such that they are symmetrical with respect to tabs 342 and 430. They are not shown in this drawing in order not to obscure the view of the termination pads. With both sets of tabs engaged, lines 120 and platform 228 are held secure such that no movement is possible. After these tabs are engaged, machine 420 proceeds to extend an ultrasonic bonding wedge tool 440 to engage the pads 132 one at a time. As tool 440 engages the pads, it presses against the front of head 130 to hold it in place against the back of aperture 340 of tool block 322. The tool uses ultrasonic vibrations (approximately 40 kHz.) to fuse the lines 120 to pads 132. The tool 440 is moved from pad to pad until all electrical bonds have been completed. The tool 440 is then retracted and the clamping tabs are released. Although ultrasonic bonding is preferred, other metal fusion technology may be used, such as thermo compression bonding.

In a preferred embodiment, the pads 132 are bonded in a balanced fashion. The tool 440 does not bond all the pads at one time, but rather bonds each individual pad one at a time. The pads 132 are designated by lower case a, b, c, and d from left to right along the slider face. In a preferred embodiment, the tool 440 bonds the pads in a symmetrical fashion from the inner most to outer most. For example, the tool 440 may go from pad b to pad c to pad d and finally to pad a. Other alternative sequences include: b, c, a, d; c, b, d, a; c, b, a, d. This alternating pattern from inside pads to outside pads is preferred because the resulting bonded leads are quite rigid and introduce a bending force. Even though the platform 228 is securely clamped, the tongue 232 of the flexure 154 is still flexible. The bending force from the first bonded lead may cause the slider 30 to roll about the longitudinal axis of the suspension. The slider 30 will roll down towards the side which has been bonded first. Therefore, in order to minimize this effect, it is preferred that the bonding be done in the alternating manner. The resulting forces tend to cancel one another out and the slider stays in the optimum level position.

In certain cases, in may be desirable to intentionally adjust the static attitude of the slider 30 such that it is rolled permanently to one side or the other. This can be accomplished during the manufacturing process by merely bonding one side first and then the other. This effect would be maximized by bonding in the sequence a,b,c,d or d,c,b,a.

The ability to hold platform 228 securely at an optimum location during the bonding process is critical. The suspension and head are very small and delicate. Flexure member 154 is easily bent. Yet, the electrical bonds between lines 120 and pads 132 must be made very strong. In the past, larger heads and suspensions used relatively large separate wires to conduct electricity to the heads. The flexures were relatively large and strong. Bonding the wires did not substantially bend the flexure. However, the smaller geometries of the present suspension require small flexures which are easily bent. The present invention provides a suspension design and process which allows for attachment of the electrical lines without bending the flexure.

After the electrical bonding process is completed, the tool block 322 is conveyed to station 310. A robot arm 500 at station 310 raises holder 326 to the up position and then removes the completed suspension assembly 80 from the tool block 322.

FIGS. 8a, 8b, and 8c show a side view of the suspension during the electrical bonding process. FIG. 8a shows the location of the tool 440 in the preferred embodiment. The tool 440 approaches each of the electrical pads 132 such that the longitudinal center line of the tool 440 is approximately aligned with the center horizontal plane 500 of slider 30. In this case, the electrical bonding will be done at the center of the slider. When the connection occurs at the center of the slider the slider will remain in a level position.

In some applications, it may be desirable to pitch the slider around its lateral axis either up or down slightly. The present invention can achieve this pitch by varying the location of the tool 440. In FIG. 8b the tool 440 approaches pad 132 such that the center line of the tool 440 is beneath the center plane 500 of slider 30. The bonding takes place below the center of the slider and the slider 30 will pitch along its lateral axis in a downward angle. FIG. 8c shows the tool 440 approaching pad 132 such that the center line of the tool 440 is above the center plane 500 of slider 30. The bonding takes place above the center plane 500 of slider 30 and the slider 30 will pitch around its lateral axis in an upward angle.

FIGS. 9a, 9b, and 9c show a side view of the suspension during the electrical bonding process. FIG. 9a shows the positions of the clamps 430 and 342 as in the preferred embodiment of the process of the present invention. In this case the position of the clamps are adjusted such that the clamped platform 228 extends in a straight horizontal plane. In some cases, it may be desirable to have the slider pitch around its lateral axis. In FIG. 9b the clamps 430 and 342 clamp the platform 228 such that the platform 228 is bent downward. This causes the slider 30 to pitch downward around its lateral axis. In FIG. 9c the clamps 430 and 342 clamp platform 228 such that the platform 228 is bent upward. This causes the slider 30 to pitch around its lateral axis in a upward direction.

The positions of the clamps 430 and 342 may also be used to impart a roll angle to the slider 30. In such a case, the clamps could be adjusted so that the clamps on one side of the platform 228 bend the platform downward and the clamps on the other side of the platform bend it upward. This would permanently bend the platform 228 such that the slider 30 is rolled at a slight angle along its longitudinal axis.

There are many alternative embodiments of the present invention. For example, it may be desirable to use the combination of tool location as shown in FIGS. 8 and clamp location as shown in FIGS. 9 to get various combinations of pitch and roll to the slider 30.

Another alternative embodiment of the present invention is to use a single pair of clamping member 342 and 430 rather than two pair as in the preferred embodiment. This single pair of clamps could engage the platform 228 at a central location. In one embodiment, the clamps could engage the platform 228 at the dog bone section 280.

Another alternative embodiment of the present invention is that the combination of clamp member location and tool location may be used to adjust or rework suspensions wherein the slider 30 is out of alignment. For example, during the manufacturing process, a certain number of suspension assemblies may have their sliders 30 bent at an undesirable angle which does not fall within the required tolerances. Placing these rejected parts back in the tool block and running them through the bonding step of the process again will result in bringing them closer to compliance. Alternatively, the rejected parts could be placed in a rework tool (similar to a tool block) which bends the parts to the desired shape. The clamping members of the tool block will tend to bend the platform 228 to its desired position. The slider 30 will need to be held rigid during this process step.

Another feature of the present invention is that the bonding tool 440 actually helps to support the platform 228 during the bonding process. See FIG. 8a. As the tool 440 presses on the electrical leads the platform 228 tends to bow downward. This is undesirable because it may effect the permanent orientation of the slider 30. However, the tool 440 comes in horizontally and acts to limit the downward bow of the platform 228 and thereby helps prevent any unwanted deformations. As the platform 228 bows downward it engages the top surface of tool 440.

Other advantages of the present invention may now be understood. The laminated suspension allows for the creation of small suspension geometries which are required in the small disk drives of today. The electrical lines are formed integrally into the suspension itself and this does away with the requirement to separately string and attach wires or wire lead assemblies (harnesses) to the suspension. The wire stringing and attachment processes were major steps needed in an assembly process. The present suspension design lends itself to an efficient assembly process whereby the head is attached to the suspension with a minimum of steps. The design of the suspension allows a machine to clamp the front platform 228 such that the platform 228 is held in an optimum position during the electrical bonding process. In addition, the present invention teaches a process whereby the orientation of the slider 30 may be deliberately set at a pitch or roll angle by varying the tool 440 and/or clamping locations on the platform 228. The tool 440 and the clamps 342 and 430 may be used to bend the flexure 142 an amount sufficient to impart a permanent deformation in the material such that a desired orientation is achieved.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for making a suspension system comprising the steps of:

receiving a suspension having a first and a second surface and having a main body and a flexible portion, a transducer head attached to the flexible portion on a first surface of the suspension, the suspension having electrical lines which run along a first surface of the suspension main body to the transducer head;

placing a first and a second clamp member in contact with the suspension, the first clamp member in contact with the suspension proximate to the transducer head, the second clamp member in contact with the second surface of the suspension directly opposite the first clamp member; and then while the suspension is so clamped performing an electrical line attachment step to attach the electrical lines to the transducer head.

2. The method of claim 1, wherein a portion of the suspension is formed from a three layer material having a support layer, an electrically insulating layer, and an electrically conducting layer.

3. The method of claim 1, wherein the main body of the suspension includes a load beam member attached to the second surface of the suspension and the load beam member has an aperture opposite the contact area of the second clamp member.

4. The method of claim 1, wherein the process further includes the step of loading a suspension and a transducer head into a tool block.

5. The method of claim 4, wherein the process further includes the step of attaching the transducer head to the suspension.

6. The method of claim 5, wherein the attachment of the transducer head to the suspension is done using an adhesive.

7. The method of claim 1, wherein the electrical line attachment step comprises using ultrasonic bonding.

8. The method of claim 1, wherein the transducer head has a plurality of attachment pads and the electrical lines are attached to the pads in a symmetrical pattern.

9. The method of claim 1, wherein the transducer head has a plurality of attachment pads and the electrical lines are attached to the pads an asymmetrical pattern.

10. A method for making a suspension system comprising the steps of:

loading a suspension and a transducer head into a tool block, the suspension having a first and a second surface and having a main body and a flexible portion, the suspension having electrical lines which run along a first surface of the suspension main body;

dispensing an adhesive to the head and positioning the suspension such that the flexible portion of the suspension contacts the adhesive on the head;

curing the adhesive;

placing a first and a second clamp member in contact with the suspension, the first clamp member in contact with the first surface of the suspension proximate to the transducer head, the second clamp member in contact with the second surface of the suspension directly opposite the first clamp member; and bonding the electrical lines to the transducer head while the clamps are in place.

11. The method of claim 10, wherein a portion of the suspension is formed from a three-layer material having a support layer, an electrically insulating layer, and an electrically conducting layer.

12. The method of claim 10, wherein the main body of the suspension includes a load beam member attached to the second surface of the suspension and the load beam member has an aperture opposite the contact area of the second clamp member.

13. The method of claim 10, wherein the electrical line attachment step comprises using ultrasonic bonding.

14. The method of claim 10, wherein the transducer head has a plurality of attachment pads and the electrical lines are attached to the pads in a symmetrical pattern.

15. The method of claim 10, wherein the transducer head has a plurality of attachment pads and the electrical lines are attached to the pads in an asymmetrical pattern.

16. The method of claim 10, wherein the bonding of the electrical lines is achieved with a bonding tool, the bonding tool location being varied in order to achieve a desired orientation of the slider.

17. The method of claim 10, wherein the bonding is achieved using a bonding tool which supports the suspension during the bonding process.

18. The method of claim 10, wherein the suspension has a platform for engaging the clamping members.

19. The method of claim 10, wherein the location of the clamping members are adjusted in order to bend the suspension to achieve the desired slider location.

20. The method of claim 10, wherein the location of the clamping members are adjusted in order to bend the suspension to achieve a desired slider location as a rework step.

* * * * *